Nov. 17, 1953  J. B. CATALDO  2,659,873
ELECTRICAL FIXTURE
Filed May 7, 1951

INVENTOR.
JOHN B. CATALDO
BY Campbell, Brumbaugh, Free & Graves
ATTORNEYS

Patented Nov. 17, 1953

2,659,873

UNITED STATES PATENT OFFICE 2,659,873

ELECTRICAL FIXTURE

John B. Cataldo, Bernardsville, N. J., assignor to John B. Pierce Foundation, New York, N. Y., a corporation of New York Application May 7, 1951, Serial No. 224,949

3 Claims. (Cl. 339—175)

This invention relates to electrical fixtures and more particularly to lamp holders and the like adapted to be attached to strip conduits.

The low fabrication and installation cost of external wiring systems makes the use of such systems practicable and desirable in low cost homes, as well as in temporary structures such as field headquarters, barracks and the like. Also such systems facilitate the improvement or expansion of wiring systems already permanently installed. The development of inconspicuous strip conduits which may be simply and safely utilized in external wiring systems has resulted in a need for electrical fixtures which may be safely and readily attached to such strip conduits.

It is, therefore, one object of this invention to provide an improved electrical fixture particularly adapted to be attached to electrical strip conduits.

It is another object of the invention to provide an improved lamp holder fixture adapted to be attached to an electrical strip conduit in such a way that the conduit may be utilized, if desired, to support the fixture.

It is a further object of the invention to provide an improved lamp holder and conduit assembly wherein an efficient electrical and mechanical connection may be effected between the heavy conductors of the conduit and the terminals of the fixture without severing the conductors.

These and other objects and features of the invention may be attained according to the invention by providing a housing for carrying a conventional lamp socket, the housing being formed with a base portion channeled to receive an electrical strip conduit comprising a pair of heavy electrical conductors covered by and held apart by a unitary, moulded insulating material. Within the base portion the insulation is stripped from the conductors and the conductors are sprung apart laterally to embrace two binding or terminal posts supported on the base. The terminals are in turn connected to the electrodes of the socket. Preferably the terminal posts comprise screws, the heads of which overlie the conductors to press the conductors into channels formed in the bus or connecting members. In this way the electrical conductors are clamped both by the springing action of the conductors laterally against the terminal posts and by the clamping action of the screws. In order to anchor the insulating material to the housing, the mounting screws for the fixture may be made to penetrate the web portion of the insulation. Alternatively the housing may be formed with holding lugs which are received in corresponding openings or recesses formed in the insulating material of the electrical conduit adjacent the points at which the insulation is stripped from the wires, thereby to anchor the insulation to the housing to prevent exposure of the bare conductors externally of the housing. Also abutments may be formed in the base portion against which the insulating material reacts to place the conductors within the fixture in tension so as to increase the springing action against the terminal posts.

The invention may be better understood by reference to the accompanying drawings illustrating a preferred embodiment thereof, in which.

Figure 1:
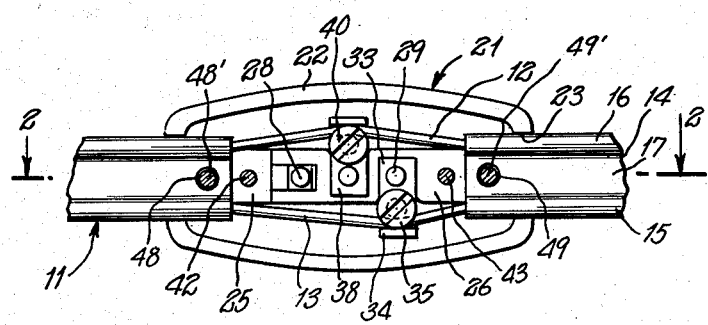
Fig. 1 is a bottom view of a lamp holder fixture showing the electrical conduit passing through the base portion, the back or cover plate of which is removed.

Referring to the drawings, the invention is shown as embodied in an electrical fixture comprising a lamp holder indicated generally by the numeral 10. The lamp holder 10 is shown attached to an electrical strip conduit 11 intermediate of the ends of the conduit. The conduit 11 comprises a pair of spaced apart conductors 12 and 13 embedded in an insulated covering 14 preferably formed with rounded or beaded edge portions 15 and 16 immediately surrounding the conductors 12 and 13. The rounded edge portions are joined by a central web or spacing portion 17. Preferably the insulating material is formed of plasticized polyvinyl chloride or like material, which has appreciable mechanical strength as well as flexibility and pliability. The combination of this insulating material with the electrical conductors 12 and 13, which may be heavy, solid copper wire such as No. 8 to 14 bus wire, affords considerable rigidity against bending in the plane containing the two conductors, but permits bending or forming about transverse axes. The conduit may, for example, be bent around a ⅝ inch mandrel, and will maintain the given configuration into which it is bent without any tendency to recover its original form. It will be understood, however, that the conduit may be returned to its original form. The conduit may be conveniently attached to a supporting surface by driving fasteners through the spacing web 17.

The fixture 10 includes a unitary insulating housing portion 18 formed with a socket portion 19 having a cylindrical opening 20. The housing 18 is also formed with an elongated base portion 21 bounded by an annular wall 22 which defines a channel for receiving the electrical conduit. The wall 22 is formed adjacent either end of the base portion 21 with openings 23 and 24 for receiving the electrical conduit 11. Of course, if the fixture is a dead end unit only one opening will be provided.

Within the base portion and adjacent either end thereof, there is formed a pair of abutment members 25 and 26 against which the web 17 of the insulation 14 abuts, it being understood that the conduit 11 between the outer surfaces of each of the abutments 25 and 26 should be stripped of its insulation without severing the electrical conductors 12 and 13.

Received within the cylindrical opening 20 is a metallic, threaded socket sleeve 27 adapted to receive the base of a conventional electric lamp. The socket sleeve 27 is attached to the housing 18 by means of screws 28 and 29 received in openings 30 and 31, respectively, formed in the base portion. A nut 32 may be attached to the screw 28 to lock it in position, and the screw 29 is preferably tapped into a connecting strip or bus-bar 33. The connecting strip 33 is disposed transversely with respect to the axis of the electrical conduit and is formed on its outer end with an edge portion 34. Tapped into the strip 33 at a point spaced slightly inwardly of the edge 34 is a screw 35 which comprises a terminal post. The head portion of the screw overhangs the edge 34 to form a clamp for the electrical conductor 13.

It will be understood that the conductor 13 must be sprung slightly outwardly in order to enter the clamp formed by the screw 35 and the edge 34.

Figure 3:
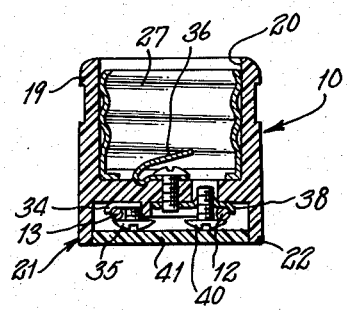
Fig. 3 is a view in transverse section taken on the line 3—3 of Fig. 2.

The second terminal of the lamp socket is a resilient center connector 36, as best seen in Fig. 3, which is secured to the housing on the axis of the opening 20 by means of a mounting screw 37. The lower end of the screw 37 is tapped into a connecting strip 38. The outer or left hand end of the strip 38 is formed with an edge 39 and a binding post or terminal screw 40 is tapped into the bus-bar adjacent the edge so that the head portion of the screw in combination with the edge forms a clamp for receiving the electrical conductor 12. It will be understood that preferably the conductor 12 should be sprung outwardly in order to be received in its clamp.

It will be recalled that the severed edges of the web 17 of the insulation engage the abutments 25 and 26. Preferably the insulation is stripped for a distance so that tension is placed on the electrical conductors by means of these abutments. In this fashion the conductors are caused to engage the terminal screws 35 and 40 laterally, independently of the clamping action of the screws.

A backing member 41 may be attached to the base portion by means of screws 42 and 43 tapped into the abutment portions 25 and 26, respectively.

Figure 4:
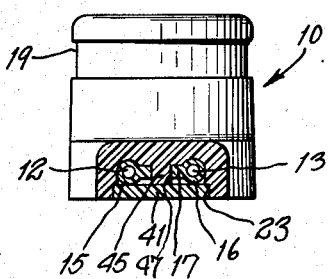
Fig. 4 is a view in transverse section taken on the line 4—4 of Fig. 5 looking in the direction of the arrows.
Figure 5:
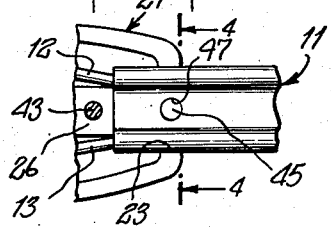
Fig. 5 is a fragmentary view showing one end of an electrical fixture having a modified web holding structure.

The fixture 10 may be carried by the conduit 11 without supplementary fasteners of any kind. Thus for example, the conduit 11 may be attached to a base-board or other supporting surface by means of fasteners driven through the web portion 17 on either side of the fixture, thus obviating the use of fasteners directly securing the fixture to the mounting surface. In such cases the insulation 14 adjacent either end of the base portion of the fixture is preferably anchored to the base portion so that the insulation is prevented from creeping backwardly so as to expose bare wires. This may be accomplished as best seen in Figs. 4 and 5 by means of anchoring lugs 45 formed adjacent the ends of the base portion which are received in corresponding openings or depressions 47, formed in the web 17 of the insulation. Preferably the lugs 45 and openings 47 are circular for ease of manufacture. The backing portion 41 holds the conduit so that it cannot detach itself from the lugs. In the event the abutment portions 25 and 26 are not used within the base portion it will be understood that the anchoring lugs described above may serve to hold the electrical conduction in tension within the housing.

Figure 2:
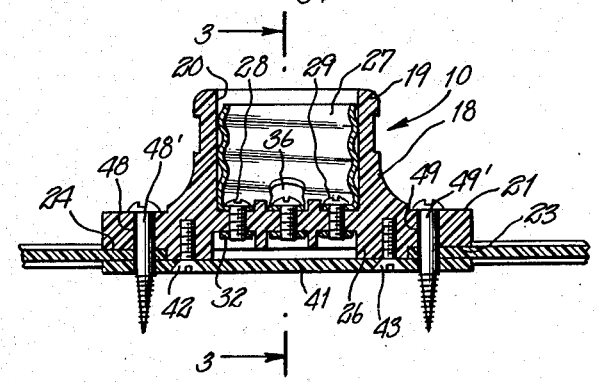
Fig. 2 is a view in longitudinal section taken on the line 2—2 of Fig. 1 looking in the direction of the arrows.

If desired, the fixture 10 may be mounted, as best seen in Fig. 2, directly on a base-board or other mounting surface, and to this end openings 48 and 49 are formed adjacent either end of the base portion to receive mounting screws 48' and 49', respectively, which may enter the mounting surface behind the fixture, and which penetrate the web 17 of the conduit in order to more tightly anchor the conduit to the fixture. The web may be formed with suitable holes for receiving the screws or alternatively the holes may be formed by the screws at the time of mounting.

The disclosed fixture is susceptible of numerous modifications in design detail without departing from the scope of the invention. For example, the connectors for effecting the electrical connection between the electrodes of the socket and the electrical conductors of the conduit may be modified according to the particular type of socket used and in accordance with the spacing of the electrical conductors of the conduit. Also the fixtures formed according to the invention may be utilized as so-called "dead end" units wherein the conduit terminates within the fixture. The invention should not, therefore, be limited save as defined in the accompanying claims.

What is claimed is:

1. A lamp socket fixture adapted to be attached to an electrical conduit comprising a pair of parallel, coplanar electrical conductors, said conductors being covered by an insulating material having a central web portion for holding the conductors in laterally spaced relationship, said fixture comprising a lamp receiving socket, a base portion for supporting the socket, said base portion having a channel formed therein for receiving the conduit, said conduit being stripped of its insulating covering within the base portion, first and second terminal means mounted within said base portion and spaced apart transversely of the conduit for a distance exceeding the normal spacing between the electrical conductors of the conduit, clamping means for securing the conductors to the terminals, and electrically conducting members for connecting each of said terminals to the socket, said web being formed with openings adjacent either end of said fixture, anchoring members carried by said base portion and received in said openings for securing the web portion against movement longitudinally of said conductors, and a pair of abutment means carried by said housing and spaced apart longitudinally of said conduit to be engaged by the insulating material of said conduit to hold the conductors within the base in tension.

2. In an electrical fixture as set forth in claim 1, said anchoring members comprising mounting screws whereby the fixture may be attached to an external supporting surface, said base portion being formed with openings for receiving said mounting screws.

3. In an electrical fixture as set forth in claim 1, said anchoring members comprising lugs formed integrally with said housing and projecting into the said channel for the conduit and to be received in said openings formed in the web of the conduit.

JOHN B. CATALDO.

References Cited in the file of this patent

UNITED STATES PATENTS

| Number | Name | Date |
| --- | --- | --- |
| 954,642 | Marshall | Apr. 12, 1910 |
| 1,698,820 | Meuer | Jan. 15, 1929 |
| 1,794,777 | Kliegl | Mar. 5, 1931 |
| 1,862,128 | Wermine | June 7, 1932 |
| 1,965,170 | Benjamin | July 3, 1934 |
| 2,517,593 | O'Brien | Aug. 8, 1950 |
| 2,567,961 | O'Brien | Sept. 18, 1951 |